United States Patent [19]

Szabo

[11] Patent Number: 5,547,590
[45] Date of Patent: Aug. 20, 1996

[54] UV-BASED WATER DECONTAMINATION SYSTEM WITH DIMMER-CONTROL

[76] Inventor: Louis Szabo, 2940 Olafson Avenue, Richmond B.C., Canada, V6X 2R3

[21] Appl. No.: 310,064

[22] Filed: Sep. 19, 1994

[51] Int. Cl.⁶ .................................................. C02F 1/32
[52] U.S. Cl. .......................... 210/748; 210/741; 210/742; 210/744; 210/760; 210/97; 210/103; 210/149; 210/205; 250/436; 250/437; 422/24; 422/186.3
[58] Field of Search ....................... 210/748, 760, 210/103, 97, 149, 143, 744, 741, 742, 205; 422/186.3, 24; 250/432 R, 435–438

[56] References Cited

U.S. PATENT DOCUMENTS

| | | | |
|---|---|---|---|
| 3,823,728 | 7/1974 | Burris | 137/88 |
| 4,141,830 | 2/1979 | Last | 210/63 |
| 4,179,616 | 12/1979 | Coviello et al. | 250/527 |
| 4,189,363 | 2/1980 | Beitzel | 204/157.1 R |
| 4,230,571 | 10/1980 | Dadd | 210/760 |
| 4,273,660 | 6/1981 | Beitzel | 210/760 |
| 4,274,970 | 6/1981 | Beitzel | 210/748 |
| 4,400,270 | 8/1983 | Hillman | 210/103 |
| 4,599,166 | 7/1986 | Gesslauer | 210/96.1 |
| 4,619,763 | 10/1986 | O'Brien | 210/177 |
| 4,769,131 | 9/1988 | Noll et al. | 210/748 |
| 5,082,558 | 1/1992 | Burris | 210/167 |
| 5,180,499 | 1/1993 | Hinson et al. | 210/706 |
| 5,207,993 | 5/1993 | Burris | 422/256 |
| 5,213,773 | 5/1993 | Burris | 422/256 |
| 5,230,792 | 7/1993 | Sauska et al. | 210/97 |
| 5,256,299 | 10/1993 | Wang et al. | 210/664 |
| 5,266,215 | 11/1993 | Engelhard | 210/748 |

FOREIGN PATENT DOCUMENTS 59-186684  2/1984  Japan .................... C02F 1/32

*Primary Examiner*—Neil McCarthy
*Attorney, Agent, or Firm*—Adrian Zahl

[57] ABSTRACT

An ultraviolet-based or dual mode water purifying system operates under household water pressure to provide a batch treatment of contaminated water. Treated water is stored in a pressurized reservoir, from which it may be released for use. A treatment cycle is initiated by a drop in pressure within the system, which occurs when sufficient water has been withdrawn from the reservoir. The pressure drop is detected by a pressure gauge linked to a UV lamp dimmer, which causes the UV lamp to change from a reduced-output standby mode to an operative mode. The dimmer may be further linked to a thermostatic switch positioned adjacent the lamp, to reduce the output of the lamp when the temperature exceeds a predetermined level, and to a backwash event control, to increase the lamp output to the operative level during filter backwash. The UV lamp may also be employed to generate ozone, which is reacted with the water in an ozone/water contactor upstream of the UV water exposure chamber, and that constitutes a helical tube with ozone being introduced to the fluid at the base of the tube and permitted to rise with the fluid through the tube. A filter may be provided between the contactor and the UV exposure chamber to remove suspended particles.

16 Claims, 2 Drawing Sheets

5,547,590

UV-BASED WATER DECONTAMINATION SYSTEM WITH DIMMER-CONTROL

FIELD OF THE INVENTION

The present invention relates to an ultraviolet ("UV") or a UV and ozone-based water purifying system for the neutralization and removal of microbial and chemical contaminants, that utilizes ozone to achieve oxidation action and ultraviolet radiation to provide a supplemental decontamination and to remove entrained ozone from the treated water.

BACKGROUND OF THE INVENTION

The oxidizing action of ozone and the antimicrobial action of ultraviolet radiation are well known, with both agents enjoying widespread use for decontaminating household water supplies. It is known to provide a decontamination apparatus that employs both agents to purify water within an integrated or dual mode system. Such systems are disclosed in, among other references, U.S. Pat. Nos. 4,141,830 (Last); 4,179,616 (Coviello et al.); 4,230,571 (Dadd); 4,189,363 (Bietzel) and 4,273,660 (Bietzel). A typical dual mode system includes an ozone generator, such as a UV lamp, and a reaction chamber, or "contactor", to expose the contaminated water to the ozone. The UV lamp also exposes a second chamber, wherein the water is irradiated. Typically, the first and second chambers comprise coaxial jackets surrounding the UV lamp, with the inner jacket being the air exposure chamber and having a housing made of a material that allows germicidal radiation to pass through to the outer, second jacket. Typically, there are also provided gas and fluid conduits and valves, as well as pumps and various means to combine the ozonated gas with the fluid. There may also be provided water filters at various positions in the device, as well as pressure regulators, valves and other components necessary for the smooth and regulated flow of water and gas through the system. A control unit may be provided to control the operation of the system, with means to control the flow rate of gas and water, and a timer to preset the operation of the device.

A drawback of existing systems resides in the power consumption and limited lifespan of UV lamps. In order to address this, it is desirable to provide a means to control the intensity of the UV lamp, in order that the lamp intensity may be attenuated when the system is not in active use. Preferably, the control should operate automatically, such that flow of water through the device automatically triggers an increased lamp intensity, and vice-versa. As well, the lamp output may be attenuated when the lamp temperature exceeds a predetermined amount; in this case, an automatic control should be provided that shuts off the flow of water through the system. In order to achieve optimal operation of the device, the rate of flow should be controlled in order that an optimal flow rate is achieved while the system is in active use.

A further advantage in such a system may be achieved by maintaining a relatively high pressure within the fluid stream. Typically, a system for the supply of potable water is linked to an incoming household water main, and is required to discharge water under pressure. Accordingly, it is desirable for the whole system to operate at the household water pressure. Efficient operation of the system may be achieved by providing treatment of water in batches, rather than strictly on a demand basis. Previous such devices, for example, U.S. Pat. No. 5,213,773 (Burris) have relied on an unpressurized (or lightly pressurized) tank for the storage of treated water, with the system being actuated to process a batch when a float switch indicates a drop in fluid level within the tank. This type of system is not well adapted to supply treated water under pressure.

In a system operating at household pressure, it is desirable to provide a means to maintain a pressurized holding tank, in order that the treated water may be discharged under pressure. Upon discharge of a sufficient quantity of treated water from the tank, with a consequent pressure drop within the tank, a control system may be provided to actuate the system to recharge the tank.

Since decontamination systems are often employed for home use, it is desirable to provide a relatively compact unit. This requirement poses a particular difficulty in the case of dual mode systems, with their relatively large number of components. This requirement may be addressed, in a dual mode system, by providing a contactor that comprises a helical coil, as described in applicant's co-pending application Ser. No. 08/189,645, that coils around one of the water filters.

The present invention has as its object the provision of a UV-based fluid decontamination system that delivers treated water under pressure, while minimizing energy consumption and maximizing bulb life. It is a further object to provide a dual mode system that is relatively compact, provides a high degree of purification to the contaminated water, and employs a high degree of automation in its operation. A further object is to provide a system that automatically provides a batch treatment of contaminated water, with the system switching automatically between standby and active modes in response to water demand and in response to bulb overheating.

SUMMARY OF THE INVENTION

The present invention is a UV based or dual mode water decontamination system that includes a control system to attenuate the UV lamp output when the lamp is not in active use. The invention comprises in its broadest form: a control unit for controlling the operation of the device; an ultraviolet lamp for the emission of ionizing radiation; an exposure chamber for the exposure of contaminated water to radiation emitted by the lamp; conduits linked to a pressurized water source to direct the flow of water through the apparatus; a valve to control the water flow through the apparatus; a reservoir to hold the treated water under pressure; and a pressure switch to measure the water pressure within the apparatus and transmit the water pressure information to the control unit. There may also be provided a second exposure chamber positioned within the first chamber, for the exposure of a stream of air to the UV lamp, in order to generate ozone for use in an ozone/water contactor. The control unit is adapted to place the system in operational mode to recharge the reservoir following withdrawal of a predetermined amount of treated water, and in standby mode when the pressure within the tank exceeds a predetermined level. The control unit includes a dimmer for the ultraviolet lamp, adapted to reduce the output of the lamp from an operational level to a standby level. The standby level is preferably about 30% of the operational level. The control unit further includes valve control means to permit the flow of water through the apparatus only when the apparatus is in operational mode. The control unit may be further linked to a thermostatic switch positioned adjacent the lamp, to place the system in standby mode when the temperature of the lamp exceeds a predetermined level. This feature is desirable in particular where a second exposure chamber, exposed to the UV lamp, is provided to generate ozonated air, since in this case the second chamber may be subject to overheating. Preferably, there is provided fluid pressure and flow regulators within the system to maintain a steady fluid flow rate through the system. In the preferred embodiment, this flow rate is about 6 gallons per minute ("gpm"). The reservoir permits the system to release treated water at flow rates of less than 6 gpm or in small quantities. There may also be provided an auxiliary nanofilter to provide a further filtration to the water. There may also be provided an automatic backwash control within the control unit, to trigger a backwash of the filters on a timed basis. Backwashing of the filters is effected by actuation of the appropriate valves and directing a flow of water through the appropriate conduits. The lamp level is increased to the operational level during filter backwash, to purify the backwash fluid before it is discharged from the system.

The invention further comprises a control unit for use in a water purification system, for the control of a UV lamp in response to water pressure information relayed to the control unit from sensors within the system. As well, the UV lamp level may be controlled by temperature information and backwash status information transmitted to the control unit. The invention further comprises a method for the sterilization of water, employing a water purification system and a control unit as described above. The method comprises, in its broadest form, the steps of measuring the pressure within the apparatus, relaying the pressure information to the control unit, increasing the lamp output when the system is in operational mode and decreasing the output when in standby mode. The system may be placed in standby mode as well by an increase in the lamp temperature above a predetermined level. The lamp may as well be placed on operational mode when a filter backwash event is triggered. The temperature, pressure and backwash status information are used as well to control a valve to permit the flow of incoming water through the device when the system is in operational mode and to prevent flow when the system is in standby mode.

DETAILED DESCRIPTION OF THE PREFERRED EMBODIMENT

The decontamination system of the preferred embodiment is intended to supply a household with treated water. The device is intended to be installed at the main household water inlet, and discharge into the central household water supply conduit. Alternatively, the system may discharge solely into the kitchen water supply.

Figure 1:
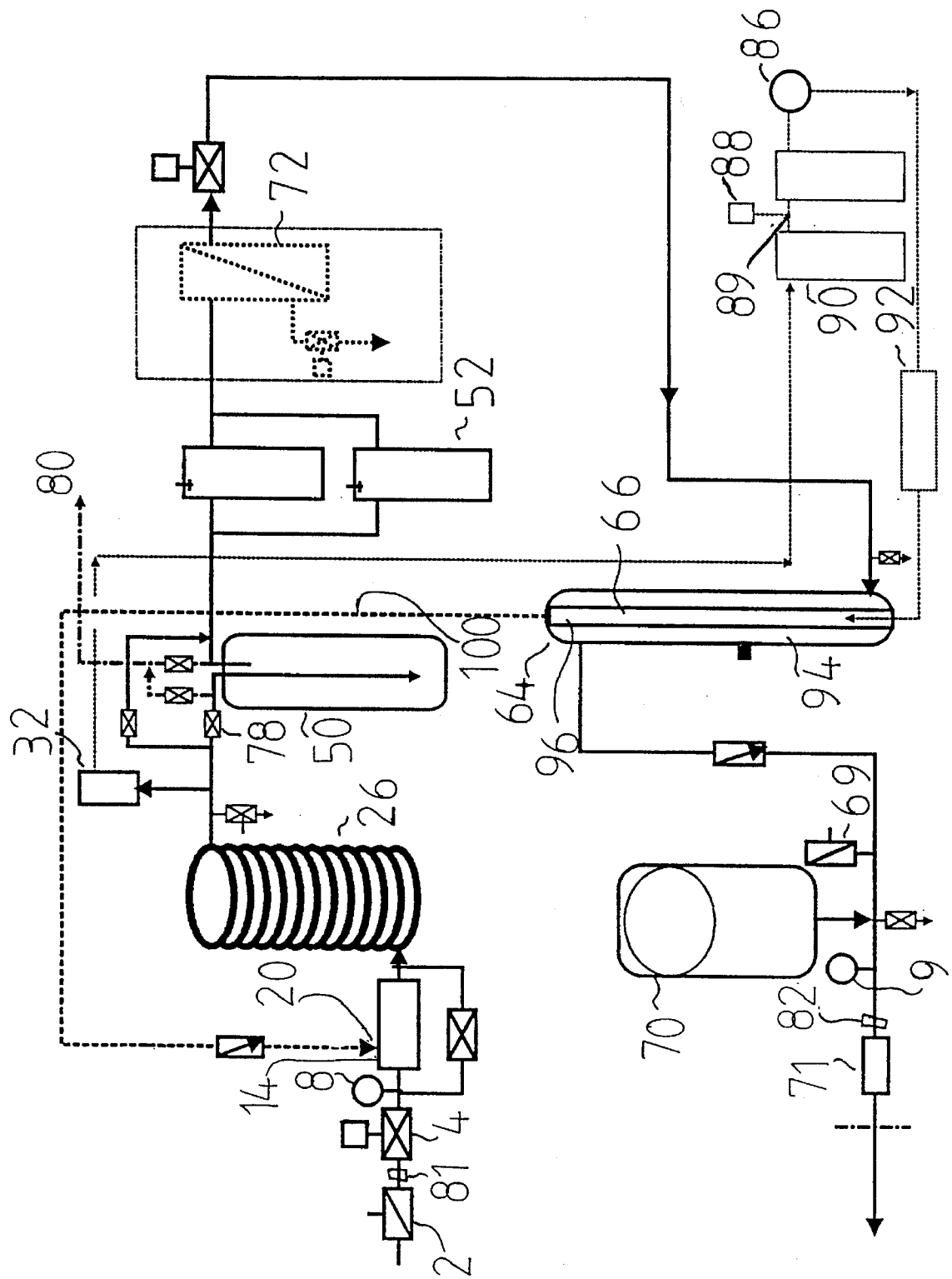
FIG. 1 is a schematic diagram illustrating the components of a preferred embodiment of the present invention.

The system comprises in general a fluid subsystem and a gas subsystem. The fluid subsystem comprises fluid conduits and elements in contact with the fluid flowing through the system from an upstream end at the pressurized fluid source to a downstream end at the fluid outlet. The fluid, typically contaminated water, is taken into the system, reacted with ozone, filtered, exposed to ionizing radiation and stored in a reservoir until withdrawn. While within the system, the fluid is maintained at a pressure generally equal to the household water pressure. The fluid subsystem is open, in that it directs a one-way flow of pressurized fluid through the system. The gas subsystem, in contrast, is a partly closed cycle wherein air is channelled through a UV exposure chamber to convert the oxygen within the air to ozone, with the ozonated air being combined and reacted with the contaminated fluid and subsequently separated from the fluid, to be redirected back to the exposure chamber. Since some of the ozonated air remains entrained or absorbed within the fluid, intake of additional air into the gas subsystem is required. As seen in FIG. 1, the two subsystems are partly separated, but are combined within the ozone/water contactor. The system is provided with a control unit, described below, that controls the operation of both subsystems.

The fluid subsystem and its method of operation will now be described, by reference to FIG. 1. Contaminated water from a household water main or other pressurized water supply, not shown, enters an inlet 2, and encounters a solenoid-actuated shut-off valve 4. The shut-off valve 4 is linked to the control system, described below, which controls the opening and closing of the valve.

A pressure gauge 8 is positioned adjacent the inlet, and a second pressure gauge 9 is positioned adjacent the outlet. The system is adapted to operate at a system pressure of about 50 PSI., which results in a flow rate of about 6 gpm through the subsystem when the device is in operational mode. The fluid is fed into an ozone mixer 14 that combines the fluid with a stream of ozonated air from the gas subsystem, described below. The mixer 14 has a restricted portion therein for the creation of a venturi effect. A gas inlet 20 enters the mixer at the restricted portion. The flow of fluid through the restricted portion draws the gas into the fluid stream, and serves as well to draw gas through the gas subsystem.

The gas/fluid mixture then enters a gas/fluid contactor 26 to thoroughly combine and react the ozonated air and the water together. The contactor comprises a helical tube having a vertical axis. The gas-fluid mixture enters the contactor 26 at its base and exits at its upper end. For optimal reaction between the ozone and fluid, the tube should have a length of about 40 feet. Two or more mixing beds are positioned within the tube, each comprising a bed of finely divided glass beads having an average diameter of about 2 mm. The beads may be held in position by a fine mesh. The mixing beds serve to diffuse the gas into the fluid.

The treated fluid then enters an off-gas collector 32, wherein the spent gas is separated from the water and recycled within the gas subsystem. The collector comprises a chamber to hold fluid discharged from the contactor. Entrained gas is released from the fluid as the fluid/gas mixture sits within the chamber and the gas accumulates at the top of the chamber. A valved conduit 44 leading from the off-gas collector directs the spent gas back to the ozone generator.

The treated fluid then enters a media filter 50, which to conserve space may be positioned within the interior of the helical coil of the contactor 26. The filter 50 comprises a bed of activated charcoal, and serves to remove suspended precipitates from the treated fluid. The fluid then enters a second, three part, filter 52, comprising an initial felt filter, followed by beds of activated charcoal and magnesium perchloride.

The filtered fluid then enters the UV reactor 64, described below, and is there exposed to ionizing radiation from the UV lamp 66. Exposure to the UV radiation serves the dual effects of providing a further sterilization, and causing the fluid to release additional entrained gas.

The treated fluid is then fed into a pressurized storage tank 70 and may be withdrawn from the system upon demand. When the pressure within the tank drops below a predetermined amount, a pressure switch 69 within the conduit immediately upstream of the tank triggers the control system to activate the device until the tank is fully pressurized.

A flow regulator 71 is positioned adjacent the outlet, to limit the flow rate of water exiting the device to a predetermined level, typically 6 gpm.

A nanofilter 72 may be provided downstream of the media filter to provide an additional filtration of the water to remove fine suspended particles.

The media filter 50 is provided with a solenoid-actuated shut-off valve 78 positioned at the entrance and exit conduits of the filter, respectively, to isolate the filters of the system from fluid flow for backwash cleaning. Actuation of the shut-off valves 78 is controlled by the control system, described below. The filter is provided with a backwash discharge nozzle 80 to direct backwash fluid into a drain, which exits the fluid subsystem. The direction of flow of fluid may be reversed through the media filter to provide a backwash mode, with the backwash fluid being discharged through the backwash discharge nozzle 80.

The nanofilter 72 is provided with a similar shut-off valve 79 for backwashing of the filter.

Operation of the system is controlled as well by probes 81 and 82, positioned within the fluid stream adjacent the inlet and outlet respectively and adapted to assess various parameters relating to water quality, for example the quantity of dissolved solids within the water. The probes are linked to the control system, as described below, which is adapted to activate an alarm or shut the system down if the system fails to remove a sufficient quantity of contaminants.

The gas subsystem and its method of operation will be described by reference to FIG. 1. After exiting the off-gas collector 32, the recycled air is fed through a desiccator to remove excess moisture. The air stream is then supplemented by additional incoming air entering the gas subsystem through an inlet 88 and joining the gas subsystem at a T-junction 89.

The incoming air compensates for ozonated air entrained within the water exiting the device, and thus lost to the gas subsystem. A compressor 86 drives the air through the conduits that comprise gas subsystem. The air then enters an auxiliary corona discharge ozone generator 92, and then the UV reactor 64. The corona ozone generator is optional, and may be included in the system if a richer ozone mixture is required, for example if the untreated water is known to be particularly contaminated. The UV reactor comprises a "dual mode" ozone generator and reactor, and combines the functions of generating ozone and exposing water within the fluid subsystem to ionizing radiation. Within the reactor, the single UV lamp 66 exposes both the fluid and gas to radiation, each within separate chambers 94 and 96, respectively, positioned one within the other. The UV source comprises a tubular lamp positioned within the air exposure chamber 96, the air exposure chamber 96 comprising a cylindrical chamber having quartz walls. The fluid chamber 94 comprises a jacket surrounding the air chamber. UV light from the lamp 66 passes through the quartz walls of the air exposure chamber to irradiate the water within the fluid chamber 94. The ozonated gas is then directed through a conduit 100 to the contactor 26, there to join the fluid cycle. A portion of the spent gas is collected from the off-gas collector 32, and returned to the gas cycle.

A temperature sensor 97 is positioned within the reactor 64 to measure the thermal output of the UV lamp and relay the information to the control unit.

Figure 2:
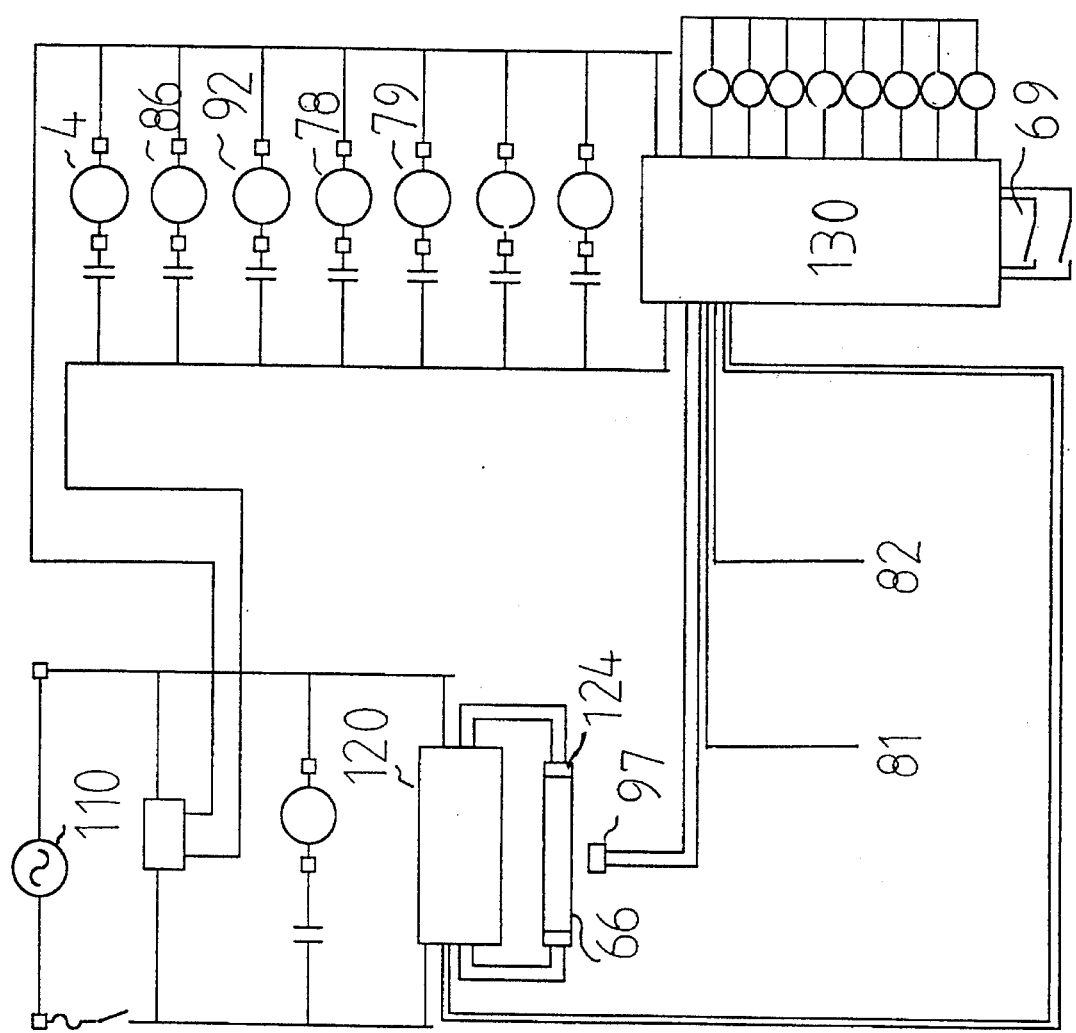
FIG. 2 is a schematic diagram illustrating the control circuit of the system.

The operation of the system is powered and controlled by a control unit, which will now be described by reference to FIG. 2. The control unit shifts the state of the system between a standby mode and an operational mode in response to various events, including demand for treatment of a batch of treated water, a filter backwash event, a temperature signal or a water quality signal, as described below. The system state is changed by changing the intensity of the UV lamp and opening or closing the main shut-off valve 4 to prevent or permit inflow of fluid into the system.

The control unit includes a UV lamp control module 120, including an electronic dimmer circuit linked to the UV lamp to control its intensity. In the standby mode, the dimmer circuit reduces the lamp intensity to a first level of about 30% of maximal output, and in the operational mode, the lamp intensity is increased to a second level of about 100% of maximal output. The UV lamp includes a dimmable electronic ballast 124 that can be preset at levels between 20% and 100% of maximum output.

A demand event is signalled by the pressure switch 69, which indicates a drop in pressure within the system below a predetermined level, following withdrawal of treated water. When sufficient treated water is withdrawn to trigger the pressure switch, the main shut-off valve is opened and the control module applies full power to the lamp. When a batch of water has been treated and sufficient pressure is attained, the lamp is placed on standby and the main shut-off valve closed.

As well, the control unit includes a thermal override system linked to a temperature sensor 97 adjacent the UV lamp, that places the lamp on standby when its temperature exceeds a predetermined level. In the event of this occurring, the control unit signals the main shut-off valve to close and triggers an alarm.

The control unit also controls backwashing of the filters on a timed basis. The timing of the backwash events is preset, and will typically be set to occur during the night when water use is minimal. The control unit permits full power to reach the lamp during operation of the backwash events, in order to sterilize the backwash fluid.

The control system is powered by a 15 amp power supply 110. The control unit includes visual indicators 112 to indicate the on/off/standby status of the system, as well as the UV lamp intensity and which of several backwash events may be occurring. The control unit includes a 24 hour timer, which adjustably controls two backwash events, namely backwashing of the media filter immediately downstream of the contactor and the optional nanofilter. A backwash event triggers one of the solenoid-actuated valves 78 or 79 immediately upstream of the component being backwashed to close, to channel the backwash fluid out of a drain immediately upstream of the filter. The control unit then directs a backwash of the filters to occur for a specified time period.

The control system as well receives signals generated by the probes 81 and 82. In response to signals indicating the level of contamination of the incoming water sent by the probe 81, the control unit triggers an audio-visual alarm 130, closes the main shut-off valve 4, and places the UV lamp on standby mode if the level of contamination exceeds a predetermined maximum. This maximum level is assessed as the level beyond which the system cannot effectively function. Similarly, the second probe 82 signals the control unit to trigger alarm, halt fluid flow and place the system on standby if the contamination level of the water exiting the system exceeds a predetermined level.

Although the present invention has been described by way of description of a preferred embodiment thereof, it will be apparent to those skilled in the art that variations may be made thereto without departing from the spirit and scope of the invention, as defined in the appended claims.

I claim:

1. A water decontamination apparatus for the batch treatment of contaminated water comprising: an ultraviolet lamp for the emission of germicidal-strength ionizing radiation; a water exposure chamber for the exposure of contaminated water to radiation emitted by said lamp; conduits to receive a pressurized stream of water from a source and to channel water through said system in a direction from an upstream end at said source to a downstream end at an exit from said apparatus; a reservoir for the storage and selective release of treated water; a pressure switch positioned to measure water pressure within said reservoir and adapted to generate a signal when said pressure and the water level within said reservoir drops below a fixed level; a valve within one of said conduits linked to said pressure switch and adapted to turn off the flow of water through said conduits when said pressure increases above said fixed level and permit the flow of water through said conduits when the pressure falls below said level; and a dimmer control for said ultraviolet lamp linked to said pressure switch and adapted to increase the output of said lamp from a first output level comprising a standby level to a second output level comprising an operative level in response to said signal.

2. An apparatus as claimed in claim 1, wherein said standby level is approximately 30 per cent of said operative level.

3. An apparatus as claimed in claim 1, wherein said pressure switch is positioned within said conduit adjacent to and upstream of said reservoir.

4. An apparatus as claimed in claim 1 wherein said dimmer control is further linked to a thermostatic switch positioned adjacent said lamp and adapted to signal said dimmer control when the temperature of said lamp exceeds a fixed level to reduce the power output of said lamp to said standby level.

5. An apparatus as claimed in claim 1, wherein there is further provided a contactor chamber for the reaction of said contaminated water with ozonated gas, said contactor being linked to said conduits upstream of said water exposure chamber, wherein said ozonated gas is introduced into said water by means of a venturi pump within one of said conduits having an inlet for said ozonated gas, said ozonated gas being generated by exposure of an air stream to said ionizing radiation within an air exposure chamber, said lamp being at least partly housed within said air exposure chamber.

6. An apparatus as claimed in claim 5, wherein said contactor comprises a helical tube having a generally vertical axis and having an entrance for a mixture of contaminated water and ozonated air at its base and an exit at its upper end for said mixture.

7. An apparatus as claimed in claim 5, wherein there is further provided a filter within one of said conduits downstream of said contactor and upstream of said water exposure chamber.

8. An apparatus as claimed in claim 7, wherein said contactor is coiled about said water filter.

9. An apparatus as claimed in claim 7, wherein said dimmer control is further linked to filter backwash means adapted to backwash said filter on a periodic basis, wherein said dimmer control is adapted to increase the output of said lamp to said operative level while said backwash is occurring.

10. A control unit for the control of the operation of a water decontamination apparatus for the batch treatment of contaminated water, said apparatus comprising: an ultraviolet lamp for the emission of germicidal-strength ionizing radiation; a water exposure chamber for the exposure of contaminated water to radiation emitted by said lamp; conduits to receive a pressurized source of water and to channel water through said system in a direction from an upstream end at said source to a downstream end at an exit from said apparatus; a reservoir for the storage and selective release of treated water; a valve within one of said conduits to control the flow of water therethrough, and a pressure switch positioned to measure water pressure within said reservoir and the water level within said reservoir and adapted to generate a signal when said pressure drops below a fixed level and transmit said signal to said control unit; said control unit comprising valve control means linked to said pressure switch and adapted to cause said valve to turn off the flow of water through said conduits when said pressure increases above said fixed level and permit the flow of water through said conduits when the pressure falls below said level, and control means for said ultraviolet lamp adapted to receive said signal from said pressure switch and increase the output of said lamp from a fixed first output level comprising a standby level to a fixed second output level comprising an operative level in response to said signal.

11. A control unit as claimed in claim 10, wherein said standby level is approximately 30 per cent of said operative level.

12. A control unit as claimed in claim 10, wherein there is further provided a linkage from said control unit to a thermostatic switch positioned adjacent said lamp and adapted to signal said control unit when the temperature of said lamp exceeds a fixed level to reduce the output of said lamp to said standby level.

13. A control unit as claimed in claim 10, wherein there is further provided a backwash event control means adapted to cause the backwashing of a filter within said apparatus on a periodic basis, said backwash event control means being linked to said dimmer control, wherein said dimmer control is adapted to increase the output of said lamp to said operative level while said backwash is occurring.

14. A method for controlling the output of an ultraviolet lamp housed within an exposure chamber of a water decontamination apparatus for the batch treatment of contaminated water, said apparatus including a pressurized reservoir for the storage and selective release of treated water, a pressure switch for measuring the pressure of the water within said reservoir and the water level within said reservoir, and a valve to control the flow of water into said apparatus, said method comprising the steps of measuring the pressure and volume of fluid within said reservoir with said pressure switch, said pressure switch being adapted to generate a signal when said pressure drops below a fixed level; relaying said signal to a control unit, said control unit including a dimmer adapted to adjust the power output of said lamp in response to the change in pressure of said fluid and valve control means linked to said valve; increasing the output of said lamp from a fixed standby level to a fixed operative level when said pressure falls below said fixed level; and causing said valve to shut off the flow of water through said apparatus when said pressure increases above said predetermined level and permit the flow of water when said pressure falls below said fixed level.

15. A method as claimed in claim 14, wherein said standby level comprises approximately 30% of said operative level.

16. A method as claimed in claim 14 wherein said control unit is further linked to a thermostatic switch positioned adjacent said lamp, said method comprising the further steps of relaying information from switch to said dimmer when said lamp exceeds a fixed temperature level; reducing the power output of said lamp to said standby level; and causing said valve to shut off the flow of water through said apparatus when said fixed temperature level is exceeded.

* * * * *